Figure 4:
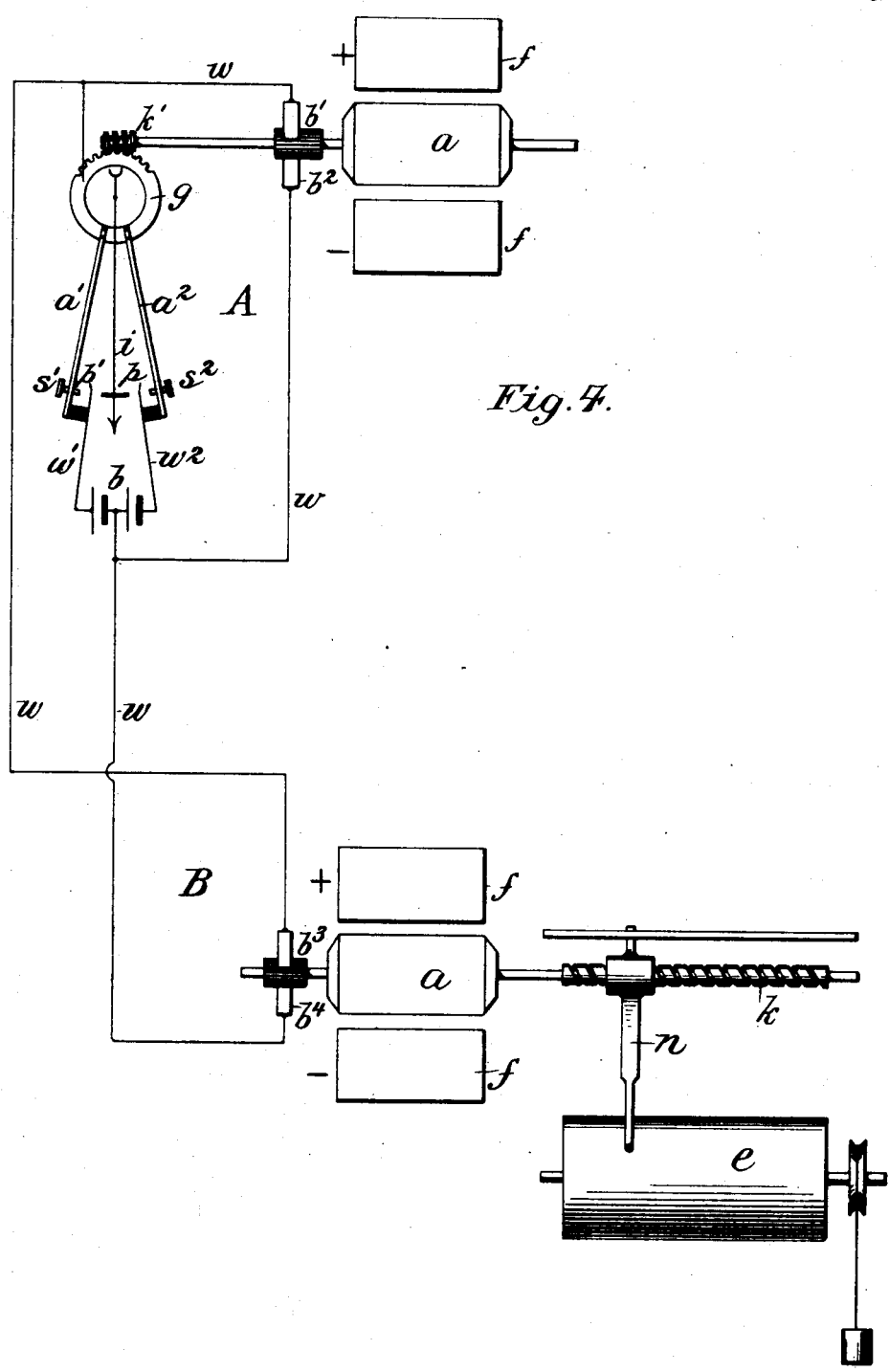

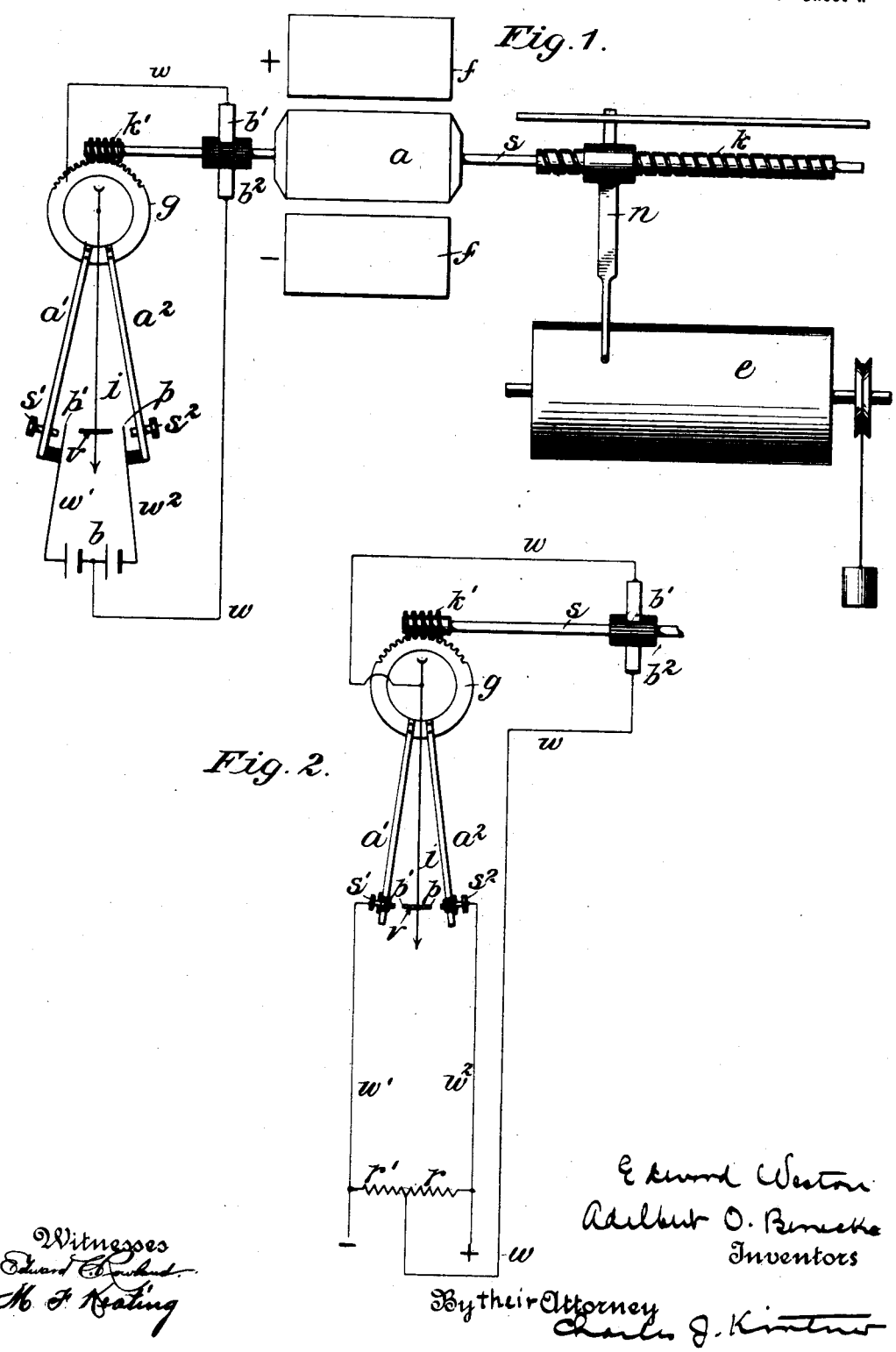

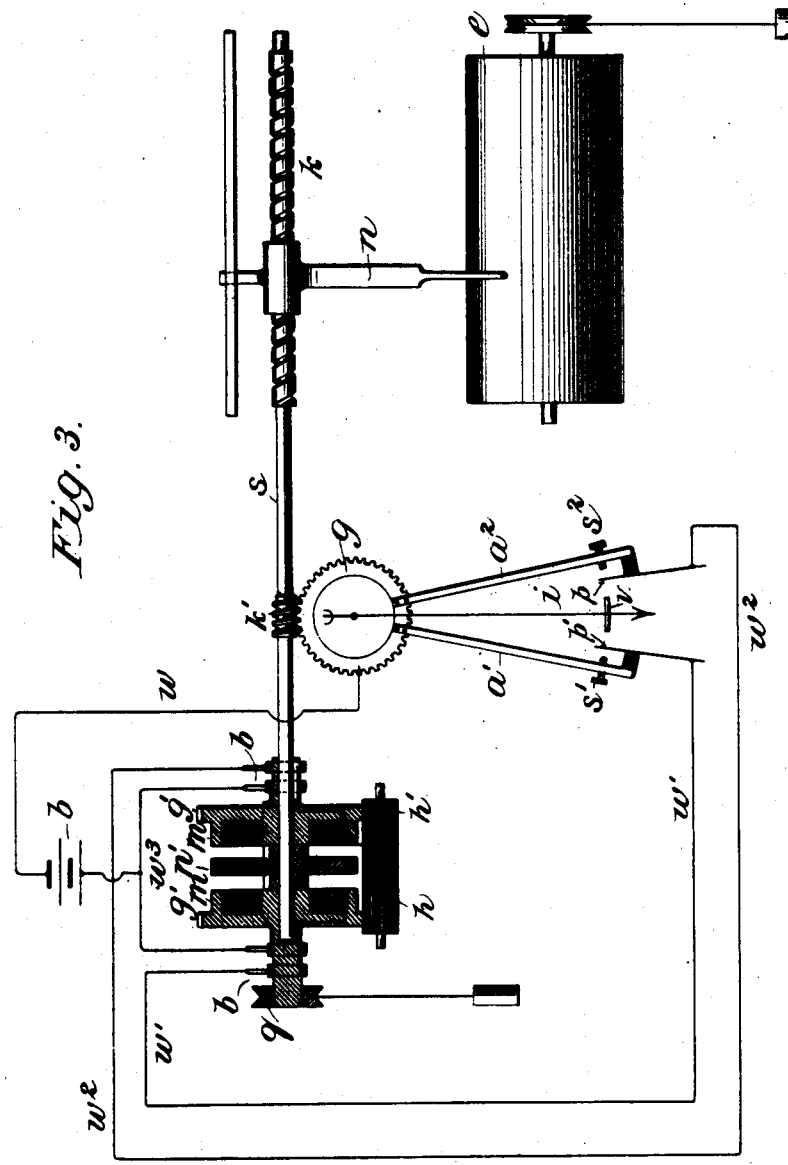

UNITED STATES PATENT OFFICE.

EDWARD WESTON, OF NEWARK, AND ADELBERT O. BENECKE, OF VAILSBURG, NEW JERSEY.

RECORDING ELECTRICAL MEASURING INSTRUMENT.

SPECIFICATION forming part of Letters Patent No. 713,258, dated November 11, 1902.

Application filed February 10, 1902. Serial No. 93,359. (No model.)

*To all whom it may concern:*

Be it known that we, EDWARD WESTON, a subject of the King of Great Britain, residing at Newark, and ADELBERT O. BENECKE, a subject of the Emperor of Germany, residing at Vailsburg, in the county of Essex and State of New Jersey, have made a new and useful Invention in Recording Electrical Measuring Instruments, of which the following is a specification.

Our invention is directed to improvements in electrically-controlled recording instruments adapted to make a permanent record of any physical change and of the nature and duration thereof; and it has for its objects, first, to provide an instrument of the character indicated which will give a correct record as to the nature and duration of any physical change acting upon a movable agent or the movable part of an instrument which indicates such change; second, to combine such an instrument with a source of electrical energy, circuits, and circuit connections whereby physical changes effected at any given point may be correctly indicated at some point more or less remote; third, to combine such an instrument with a source of electrical energy, circuits, and circuit connections whereby physical changes effected at any given point may be correctly recorded as to their nature and duration at some point more or less remote.

Our invention will be fully understood by referring to the accompanying drawings, in which—

Figure 1 is a diagrammatic view illustrating one form of the instrument. Fig. 2 is a similar diagrammatic view illustrating a modified manner of effecting the control of the driving-motor of the recording part of the instrument. Fig. 3 is a diagrammatic view illustrating a still further modified form of the invention, the means for controlling the mechanical movements of the apparatus being shown in sectional view. Fig. 4 is a diagrammatic view illustrating the modified form shown in Fig. 1 combined with an electric circuit and circuit connections for effecting the record at a point more or less remote from the point where the physical changes are applied to the instrument.

In prior United States Patents Nos. 490,699 and 494,829, granted to Edward Weston on the 31st day of January, 1893, and 4th day of April, 1893, two types of electrically-controlled recording instruments are shown and described in which the records are made respectively of variations in current-flow or potential difference through the agency of an electrically-driven recording-stylus controlled by the movable part of an electrical measuring instrument operatively connected with a source of electrical energy, the variations in current-flow or potential difference, as the case may be, and the time of such variations being placed upon a record-sheet in such manner as to indicate the nature and duration thereof.

The present improvement embraces, generically, the application of the principles embodied in the instruments disclosed in the before-mentioned patents, with this difference, however, that with the apparatus which constitutes the subject-matter of the present application it is designed to make a correct record of physical changes generally in nature acting upon the movable part of an indicator and in such manner that the movements of said movable part will control the application of power to a recording apparatus and will simultaneously utilize a part of the power thus applied to mechanically vary such control in accordance with the continuous or successive movements of the movable part of such indicator in either direction. In other words, with the instruments disclosed in the before-mentioned patents to Weston the control of the application of electrical energy to the electromotive device which drives the movable stylus of the recording instrument is effected by electrically varying the current-flow through the movable coil of an electrical measuring instrument, the index-needle of which controls the movement of the electromotive device.

With the present improvement the motive device is connected mechanically to the controlling apparatus and in such manner that the variations of the physical changes which effect the movement of the indicator or movable agent may vary from zero to a maximum amount in either direction, thus making it possible to make an accurate visual indication or record of any kind of physical change in nature which may have a wide range of variation—as, for instance, the action of steam confined in a boiler-room upon a steam-gage, of the rise and fall of the tide upon a tide-indicator, of the wind upon a wind-vane, changes of temperature upon a thermometer or thermostat, changes of barometric conditions upon the movable part of a barometer, the angular variations of a ship's compass—in short, any physical change which will impart movement in opposite directions to the movable part of an instrument affected by such changes.

Referring now to the drawings in detail for a full and clear understanding of our invention, such as will enable others skilled in the art to construct and use the same, and first to Fig. 1, $i$ represents an index-needle or movable part of an indicator adapted to give indication of some physical change in nature—as, for instance, the movable part of a pressure-gage for a steam-boiler, a wind-vane, a thermometer, a barometer, or other physical indicator—the movements of which it is desired to copy upon another indicating instrument located at a point more or less remote or to make a permanent record of such movements both as to their nature and duration. $a$ represents a rotary armature, and $f$ the field-magnets, of an electromotive device having a shaft $s$ and worms or screws $k$ $k'$ at its opposite ends, the worm $k$ being operatively connected through a nut or pin with an arm $n$, carrying a recording-stylus at its free end adapted to make a record upon a record surface or sheet carried by a time-driven cylinder $e$. $g$ is a worm-gear supporting two arms $a'$ $a^2$ at one side and adjustable contacts $s'$ $s^2$, $p$ $p'$ being yielding contacts insulated from the before-mentioned arms and connected by conductors $w'$ $w^2$ to the opposite poles of a battery $b$, $w$ $w$ being conductors running from the worm-gear $g$ and the middle of the battery $b$ to the commutator-brushes $b'$ $b^2$. The armature-shaft $s$ being mechanically connected to the worms or screws $k$ $k'$ is capable of imparting at the same time motion to the arm $n$, carrying the recording-stylus, and the worm-gear $g$, carrying the arms $a'$ $a^2$. The operation of this form of the apparatus is as follows: Suppose the index-needle $i$ to be the index-needle of a steam-gage connected to a steam-boiler and that for the moment it is pointing to zero upon the index-scale thereof, (not shown,) there being no pressure in the boiler. Suppose also that the cylinder $e$, provided with a record-sheet (not shown) having coördinate lines marked thereon indicative of hours in a direction parallel with the axis of the cylinder $e$ and of pounds pressure in a direction at right angles thereto, is set in motion by a clock-propelled mechanism and that the stylus at the end of the arm rests upon the record-sheet at a point indicating, say, seven o'clock in hours and no pounds pressure and that a fire has been started under the boiler. As soon as pressure is applied to any extent to the steam-gage the index-needle $i$ will be moved in the direction of the hands of a watch, causing the arm $v$, carried thereby, to act upon the yielding contact $p'$, so as to close the circuit from the left-hand half of the battery $b$ by conductor $w'$, contacts $p'$ $s'$, arm $a'$, worm-gear $g$, conductor $w$, commutator-brush $b'$, coils of the armature $a$, commutator-brush $b^2$, back to the negative pole of the battery. As long, therefore, as the index-needle $i$ continues to be moved in the direction of the hands of a watch, maintaining the circuit closed, the rotary armature $a$ will continue to rotate, imparting motion to the worm or screw $k$ in such a direction as to move the arm $n$, and consequently the stylus carried thereby, in a direction from left to right, thus giving a diagrammatic indication of the increase in pressure. The forward rotary movement of the cylinder $e$ will during the same time cause the stylus to give a coördinate indication of the time during which this change of pressure continues. The worm $k'$ will simultaneously rotate the worm-gear $g$ and arms $a'$ $a^2$ in the direction of the hands of a watch, following the movement of the index-needle $i$. Finally, when the maximum pressure is reached the continued rotation of the armature so long as the circuit remains closed at the contacts $s'$ $p'$ will cause the worm-gear $g$ and arms $a'$ $a^2$ to be rotated still farther in the same direction until the circuit is interrupted, and the stylus will therefore continue to indicate upon the record-surface this maximum pressure. Any diminution in pressure will in like manner cause the index-needle $i$ of the pressure-gage to be moved in the opposite direction, closing the circuit between the contact $p$ and stationary contact $s^2$ from the right-hand half of the battery $b$ through the conductors $w$, commutator-brushes $b^2$ $b'$, and armature $a$, imparting motion to the arm $n$ and stylus carried thereby from right to left, simultaneously moving the worm-gear $g$ and arms $a'$ $a^2$ from left to right, the record of diminished pressure being placed upon the record-surface, both as to its nature and duration, as before, the circuit being finally interrupted at the contacts $p$ and $s^2$ when the diminished pressure has ceased. It will be apparent that by reason of the mechanical relations between the rotary armature $a$, worms $k$ $k'$, arm $n$, and worm-gear $g$ with the supporting-arms $a'$ $a^2$ it is possible to vary the position of the recording-stylus upon the record surface or sheet in exact proportions to the corresponding variations as to pressure in the boiler and the influence of such pressure upon the movable index-needle $i$ and that these variations will be recorded upon the record-surface both as to their nature and duration.

In Fig. 2 of the drawings we have illustrated a modified means of effecting the reversal of current through the rotary armature at the commutator-brushes $b'$ $b^2$ and also a more delicate means of effecting the closure of the circuit by the movement of the index-needle $i$, which in this instance constitutes a part of the circuit, carrying at its free end, as it does, the arm $v$, the ends of which constitute movable contacts $p$ $p'$, adapted to contact with adjustable insulated contacts $s^2$ $s'$, carried by the arms $a'$ $a^2$. The source of electrical energy (not shown) is connected directly to conductors $w'$ $w^2$, running to the contacts $s'$ $s^2$, and $r$ $r'$ is a resistance in shunt thereto. One branch of the conductor $w$ runs from the middle of the resistance $r$ $r'$ to the commutator-brush $b^2$, and the other branch thereof runs directly from the index-needle $i$ to the commutator-brush $b'$. The operation will be obvious on inspection of the drawings, it being apparent that when the index-needle $i$ is moved in the direction of the hands of a watch the circuit is closed to the motor from the + pole of the battery by the right-hand half $r$ of the resistance, conductor $w$, commutator-brush $b^2$, coils of the armature, commutator-brush $b'$, conductor $w$ to the index-needle $i$, contacts $p'$ $s'$, conductor $w'$ to the negative pole of the battery. When the index-needle $i$ is moved from left to right, the circuit is closed between the contacts $p$ and $s^2$, so that the current flows from the + pole of the battery by contacts $s^2$ $p$, index-needle $i$, conductor $w$, commutator-brush $b'$, coils of the armature, commutator-brush $b^2$, conductor $w$, left-hand half $r'$ of the resistance to the negative pole of the battery.

In Fig. 3 of the drawings we have illustrated a further modified form of instrument for effecting the results sought. In this form of the apparatus the shaft $s$ is driven by a mechanical source of power, as a weight acting upon a pulley $q$. $m$ and $m$ are magnetic clutches adapted to run loosely upon the driving-shaft $s$, said clutches being provided with the usual magnetizing-coils electrically connected with current-collecting rings and pairs of brushes $b$ $b$, resting thereon, to conductors $w'$ $w^2$ $w^3$ and the positive pole of the battery $b$, the negative pole of which is connected directly to the worm-gear $g$. Each of the mechanical clutches $m$ is provided with gear-teeth $g'$ $g'$ at its outer circumference, adapted to mesh, respectively, with pinions $h$ $h'$, which in turn mesh with each other. $n'$ is a magnetizable disk loosely keyed to the shaft $s$ and adapted to be moved in either one direction or the other, according to which of the two clutches is magnetized. The other parts of the apparatus and circuit connections are not substantially different from the like parts disclosed in Fig. 1, except that the circuit connections are varied here to suit the condition of the clutching mechanism and the application of power from a mechanically-applied source of energy, as a weight acting upon the pulley $q$. The operation of this form will now be described. Suppose the index-needle $i$ to be moved in the direction of the hands of a watch by the pressure-gage, as before, until the circuit is closed by the arm $v$, carried by the needle between the contacts $p'$ $s'$. Current will flow from the + pole of the battery by the conductor $w^3$, current-collecting rings and coils of the left-hand clutch $m$, brushes $b$ $b$, conductor $w'$, contacts $p'$ $s'$, arm $a'$, worm-gear $g$, conductor $w$ to the negative pole, causing the disk $n'$ to be drawn from right to left until its face comes frictionally into contact with the clutch $m$, so that motion is now imparted by the pulley $q$ through the clutch $m$ and disk $n'$ to the shaft $s$ in the proper direction to cause the shaft $s$ and worm $k$ to move the stylus carried by the arm $n$—say from left to right. Consequently the worm $k'$, acting as before, rotates the worm-gear $g$ in the proper direction to cause the index-needle to interrupt the circuit between the contacts $p'$ $s'$, the proper record being placed upon the record sheet or surface, as before. In like manner a movement of the index-needle in a reverse direction of the hands of a watch causes the circuit to be closed for diminution of pressure between the contacts $p$ and $s^2$, thus magnetizing the right-hand clutch $m$ and causing the magnetizable disk $n'$ to be brought frictionally into contact with its face, so that motion is now imparted through the left-hand clutch $m$, pinion $h$, pinion $h'$, right-hand clutch $m$ in a reverse direction, thus causing the shaft $s$ to move the arm $n$ and also the arms $a'$ $a^2$ to the right, placing upon the record sheet or surface the proper record and ultimately restoring the index-needle to its central position.

In Fig. 4 of the drawings we have shown how our invention may be utilized for the purpose of recording physical changes, as to their nature and duration, at a point more or less remote from the point where such changes occur. In this figure of the drawings the apparatus at a given point, say at A, is identically like that shown in Fig. 1 of the drawings, except that the recording part of the apparatus is omitted, the recording apparatus being in this instance located at a point more or less remote, say at B. There are two driving electric motors, one at A and the duplicate at B, and these motors are connected in multiple by conducting-mains $w$ $w$.

The operation of the apparatus will be obvious in view of the description of the mode of operation of the instrument disclosed in Fig. 1, it being only necessary to note that the movable stylus carried by the arm $n$ at B follows accurately the movement imparted to the index-needle $i$ by the worm $k'$ and armature $a$ at A. In this instance the arm $n$ may either carry or be connected with an index-needle adapted to move over an index-scale and to correspond with an index-scale, (not shown,) but applicable with the index-needle $i$ of the controlling instrument at A, so that with such an arrangement it is possible to make both visual indications and records of physical changes at one or more points more or less remote from a point where the changes occur. Such an instrument has a wide use in the arts, as hereinbefore indicated.

We do not limit our invention to the specific details of construction disclosed in the several forms of the structural apparatus designed to accomplish the results sought, as obviously many of these details might be departed from and still come within the scope of our claims hereinafter made.

Our invention is directed generically to an instrument or apparatus designed to be combined with a movable element or agent which gives indications by its movement of physical changes of any nature whatever, whether the same be free to move in opposite directions under the sole influence of a physical agent or moved in one direction only, thereby being opposed in its opposite movement by a fixed or variable force, as is the case with many measuring instruments, together with indicating or recording mechanism operatively connected therewith in such manner that the physical changes imparted to the movable agent, both as to their nature and as to the time or duration thereof, shall be correctly indicated or recorded, or both, and our claims are generic as to this feature.

While we have defined that part of the recording instrument which moves back and forth over the record surface or sheet as a "stylus," we do not wish to be limited in this particular to any specific form of stylus or recording element, as obviously any movable element which would produce upon the record surface or sheet carried by the cylinder $e$ a record-line might be substituted for what is known generically in the art as a "stylus."

Having thus described our invention, what we claim, and desire to secure by Letters Patent of the United States, is—

1. An instrument for recording the nature of physical changes, consisting of a movable agent or part controlled in its movements by such changes; a recording instrument and a motive device mechanically connected to the movable stylus of such an instrument; in combination with a source of electrical energy and movable circuit-controlling contacts electrically and mechanically connected to the motive device which drives the stylus, and electrically connected to the movable agent in such manner that the movable contacts are caused to follow the movement of the movable agent in either direction and the movable part of the motive device correspondingly varied as to its direction of rotation, substantially as described.

2. An instrument for recording the nature and duration of physical changes, consisting of a movable agent or part controlled in its movements by such changes; a power-impelled recording instrument and a motive device mechanically connected to the movable stylus of said instrument; in combination with mechanical and electrical connections between the motive device and the movable agent in such manner that any physical change of the movable agent is accurately recorded as to its nature and duration, substantially as described.

3. An instrument for recording the nature and duration of physical changes, consisting of a movable agent or part controlled in its movements by such changes; a power-impelled recording instrument and a motive device mechanically connected to the movable stylus of said instrument; in combination with a source of electrical energy and movable circuit-controlling contacts electrically and mechanically connected to the motive device which drives the stylus, and electrically connected to the movable agent in such manner that the movable contacts are caused to follow the movement of the movable agent in either direction and the movable part of the motive device correspondingly varied as to its direction of rotation, substantially as described.

4. An instrument for recording the nature of physical changes at a point more or less remote from that at which they occur, consisting of a movable agent or part controlled in its movements by such changes; a recording instrument located at the more remote point; motive devices located at both points and a source of electrical energy; together with electrical and mechanical connections between the motive device at the first-named point and circuit connections connecting the two motive devices, substantially as described.

5. An instrument for recording the nature and duration of physical changes at a point more or less remote from that at which they occur; consisting of a movable agent or part controlled in its movements by such changes; a motive device, a source of electrical energy and electrical and mechanical connections between the motive device and the movable part or agent; in combination with a time-impelled recording instrument located at the more remote point; a motive device having its movable part operatively connected to the stylus of the recording instrument and circuit connections between the two motive devices, whereby the movable parts thereof are caused to run in substantial synchronism as to direction and duration, substantially as described.

6. An indicating instrument having a movable part adapted to give visual indications of physical changes in nature; in combination with a source of electrical energy, a motive device and circuits and circuit connections between the motive device and the movable part of the indicator, whereby the movable part of the motive device is caused to follow the movements of the movable part of the indicator through all ranges and directions of its movement, substantially as described.

7. An indicating instrument having a movable part unconstrained in its movements, such as a compass-needle; in combination with a source of electrical energy; together with movable contacts operatively connected to a motive device and circuits and circuit connections between the movable part of the indicating instrument and of the motive device, whereby the movable part of the latter will follow the movements of the movable part of the indicator through all ranges and directions of movement, substantially as described.

8. An indicating instrument having a movable part unconstrained in its movements; a motive device and a source of electrical energy; in combination with movable electrical contacts operatively connected to the movable part of the motive device and adapted to be moved in opposite directions thereby; together with circuits and circuit connections between the source of electrical energy, the movable contacts, the movable part of the indicator and the motive device, all so arranged that the movable part of the motive device will follow the movements of the movable part of the indicator through all ranges and directions of movement, substantially as described.

In testimony whereof we have signed our names to this specification in the presence of two subscribing witnesses.

EDWARD WESTON.
ADELBERT O. BENECKE.

Witnesses:
W. H. YAWGER,
C. J. KINTNER.